United States Patent
Casanovas Bermejo et al.

(10) Patent No.: US 11,060,507 B2
(45) Date of Patent: Jul. 13, 2021

(54) FLOATING STRUCTURE FOR OFFSHORE WIND TURBINE

(71) Applicant: EXPONENTIAL RENEWABLES, S.L., Barcelona (ES)

(72) Inventors: Carlos Casanovas Bermejo, Barcelona (ES); Juan Casanovas Rodríguez, Barcelona (ES)

(73) Assignee: EXPONENTIAL RENEWABLES, S.L., Barcelona (ES)

( * ) Notice: Subject to any disclaimer, the term of this patent is extended or adjusted under 35 U.S.C. 154(b) by 99 days.

(21) Appl. No.: 16/623,971

(22) PCT Filed: Jun. 19, 2018

(86) PCT No.: PCT/IB2018/054499
§ 371 (c)(1),
(2) Date: Dec. 18, 2019

(87) PCT Pub. No.: WO2018/234986
PCT Pub. Date: Dec. 27, 2018

(65) Prior Publication Data
US 2020/0173422 A1 Jun. 4, 2020

(30) Foreign Application Priority Data
Jun. 20, 2017 (ES) ................ ES201730817

(51) Int. Cl.
*F03D 13/25* (2016.01)
*F03D 7/02* (2006.01)
(Continued)

(52) U.S. Cl.
CPC ............. *F03D 13/25* (2016.05); *F03D 7/02* (2013.01); *F03D 13/10* (2016.05); *F03D 13/20* (2016.05);
(Continued)

(58) Field of Classification Search
CPC .......... F03D 13/25; F03D 80/82; F03D 80/88; F03D 80/70; F03D 13/40; F03D 13/35;
(Continued)

(56) References Cited

U.S. PATENT DOCUMENTS

| 6,294,844 B1 | 9/2001 | Lagerwey |
| 9,139,266 B2 | 9/2015 | Roddier et al. |
| 2016/0061192 A1 | 3/2016 | Guyot |

FOREIGN PATENT DOCUMENTS

| CA | 2609745 A1 | 12/2006 |
| DE | 3107252 A1 | 9/1982 |

(Continued)

OTHER PUBLICATIONS

International Search Report and Written Opinion dated Oct. 11, 2018 in corresponding International Application No. PCT/IB2018/054499; 13 pages.

*Primary Examiner* — Aaron R Eastman
(74) *Attorney, Agent, or Firm* — Maier & Maier, PLLC

(57) ABSTRACT

A floating offshore horizontal axis wind turbine structure, including an anchored part anchored to a sea bed, and a rotatable part, the structure being supported by at least a pivot buoy, the pivot buoy includes a lower body anchored to the seabed and an upper body fixed to the rotatable part structure; an electrical connection between the lower body and the upper body; and a yaw system connecting the upper body with the lower body. The yaw system includes an inner ring connected to one of the upper and lower body, and an outer ring connected to the other of the upper and lower body; wherein the inner and outer rings are configured to rotate with respect to each other around a vertical yaw axis. The yaw system allows an alignment of the rotatable part with the prevailing wind direction, by rotating about the vertical yaw axis.

14 Claims, 6 Drawing Sheets

(51) Int. Cl.
    *F03D 13/10*         (2016.01)
    *F03D 13/20*         (2016.01)
    *F03D 13/35*         (2016.01)
    *F03D 13/40*         (2016.01)
    *F03D 80/70*         (2016.01)
    *F03D 80/80*         (2016.01)

(52) U.S. Cl.
    CPC ............. *F03D 13/35* (2016.05); *F03D 13/40* (2016.05); *F03D 80/70* (2016.05); *F03D 80/82* (2016.05); *F03D 80/88* (2016.05)

(58) Field of Classification Search
    CPC . F03D 13/20; F03D 13/10; F03D 7/02; F03D 7/0204; F03D 13/22; Y02E 10/727; Y02E 10/72; F05B 2240/95; F05B 2240/97; B63B 24/50; B63B 35/44; B63B 2021/505; B63B 2035/446
    See application file for complete search history.

(56) References Cited

FOREIGN PATENT DOCUMENTS

| | | |
|---|---:|---|
| EP | 2993270 A1 | 3/2016 |
| GB | 2394498 A | 4/2004 |
| WO | 02/073032 A1 | 9/2002 |
| WO | 2010/071433 A2 | 6/2010 |
| WO | 2012/169914 A1 | 12/2012 |
| WO | 2015/000909 A1 | 1/2015 |
| WO | 2016/083634 A1 | 6/2016 |

FLOATING STRUCTURE FOR OFFSHORE WIND TURBINE

FIELD

The present invention belongs to the field of offshore wind energy. In particular, the invention refers to a floating structure for the support of an offshore wind turbine generator (offshore WTG, or OWTG), more specifically an OWTG based on a horizontal axis wind turbine (HAWT), and the subsystems that characterize it.

BACKGROUND

The field of floating offshore wind remains, as of 2017, almost non-existent at the commercial level, with only a handful of concepts having undergone a successful test phase with a full-scale prototype, and a single pre-commercial windfarm (built by Statoil). However, a variety of concepts for floating offshore substructures has been described and published in different patents. Some of these, particularly related to the present invention, are highlighted next.

U.S. Pat. No. 6,294,844 relates to an installation comprising windmills which are mounted in a frame, said frame is provided with float bodies and it is capable of rotation about a vertical axis in order to turn the windmills towards the wind. In order to keep the windmills upright, supporting means, for example a body which is anchored to the bottom, are disposed some distance away from the plane of the windmills. Furthermore, means are provided for improving or simplifying maintenance.

The patent WO02073032 A1 describes another similar system with a passive weathervaning system which allows the whole structure to rotate around an anchor point comprising a bearing that acts as pivot point. Again it is shown as being able to support multiple wind turbines, each with its own tower. Several possible configurations are presented, without detailing how the anchoring of such a structure could be performed, how to manage the electrical cable, or how to substitute one of the main components, which would require the use of crane vessels or towing the entire structure to port.

The patent DE3107252 A1 describes another floating system, which passively weathervanes around an anchor point directly on the sea bed, without the existence of a controlled pivoting point (bearing). This poses a dangerous problem for the mooring system itself and for the electrical cable, which would eventually be damaged by the structure rotating uncontrolled.

Other obvious precedents in the state of the art are fixed offshore wind turbines (FOWT), which are "marine" versions of traditional onshore wind turbines, comprising an almost invariably tubular tower on top of a jacket or monopole foundation, and a top-mounted nacelle with an active yaw system to ensure that the turbine axis remains well aligned with the wind. While FOWTs enjoy much higher mean wind speeds than those available on land, they have installation, and Operation and Maintenance (O&M) costs that are much higher than those of onshore wind turbines, mainly due to the need of using big crane vessels for any important operation.

Finally, a few of the main floating offshore wind turbine (FOWT) concepts that already exist in the market can be highlighted. Almost invariably, they make use of a floating substructure that is inherited from technology for oil and gas extraction in offshore platforms. On top of this substructure they mount a more or less conventional turbine with a tubular tower and an active yaw system. Specifically, a few patents can be highlighted:

Patent U.S. Pat. No. 9,139,266 B2 describes the Windfloat concept, developed by Principle Power. It is based on a semi-submersible (semisub) platform, well known in the offshore oil and gas sector. This structure presents the drawback of being very heavy, with a relatively complex catenary mooring system that extends radially and downwards towards the sea bed with 6 mooring lines that connect to the structure in tension, which makes the operation somewhat difficult and time-consuming. In case of turbine failure, the platform can be disconnected and be taken to port for O&M, but this disconnection operation is just as complex as the initial connection, and a temporary buoy needs to be put in place to keep the 6 mooring lines and electrical cable close to the surface in order to be reconnected to the platform later.

Patent CA2609745 C describes the Hywind concept from company Norsk-Hydro, which uses a spar buoy, another well-known oil and gas platform that obtains its stability through a big counterweight at the bottom end of the long spar buoy. Its main disadvantages are a large draft of over 100 m (around the same height as the wind turbine they support) which is needed for the counterweight to be effective, but makes a port assembly of the wind turbine impossible. This has to be performed on deep waters using big crane vessels, which are also needed whenever a main component needs to be substituted or to uninstall the entire system. It also uses a catenary mooring system with long, heavy chains.

Patent WO2015000909 A1 describes a tension leg platform (TLP) substructure for supporting an offshore wind turbine. The TLP is another well-known offshore platform type developed by the oil and gas sector for very deep water systems, characterized by a system of vertical cables (or tethers) which keep most of the floatation elements fully submerged thanks to the pretension on the tethers. Its main problem in its use as support structure for wind turbines is its very complex and risky installation on open sea. If the wind turbine is installed near-shore or in a port, then the entire system is unstable during transport to site and during installation and mooring. If the TLP is moored first and then the wind turbine is mounted on top, then the use of big crane vessels is required. Again, substitution of any main component of the turbine requires the use of big crane vessels. If the entire platform is to be sent to port, then a complex platform disconnection process needs to be performed, and it is just as complex as the initial installation was.

WO02/073032 relates to an offshore floating wind power generation plant disclosing all the features of the preamble of claim 1 of this patent application.

WO2016/083634 discloses a floating platform for harnessing wind energy comprising a tower with a wind turbine and two horizontal identical cylindrical floating elements parallel to a longitudinal axis and interconnected by bar structures.

US2016/0061192 relates to a floating wind turbine structure comprising three support arms supporting a nacelle by its upper portions and the lower portions being associated with means in the shape of floats.

WO2010/071433 describes removable offshore wind turbines with pre-installed mooring system comprising at least two wind turbines mounted on a floating open structure being moored to the seabed with a mooring system.

EP2993270 discloses a submersible active support structure for turbine towers in off-shore facilities comprising concrete bodies joined together by means of beams with a pumping system that regulates the inclination of the structure based on the overturning moment and equipped with means for regulating immersion.

As has been discussed, a common problem to all FOWT described in the state of the art is that they require continued use of powerful ships and heavy crane vessels in several phases of the product life cycle. This limits the deployment of FOWTs for power generation in more remote areas of the planet where such a fleet of vessels is seldom available, these areas being actually the ones that would benefit the most from access to this kind of renewable energy production platform.

An object of the present invention is to overcome at least some of the problems discussed above, namely in some examples eliminating the use of heavy crane vessels in several stages of the FOWT lifecycle (installation, O&M, decommissioning), and in some examples to simplify the connection and disconnection system of the platform so it can be done quickly and efficiently by small crews. Additionally, in some examples, the proposed platform is very light in comparison to most FOWTs in the state of the art, which is a big advantage in itself.

One or more of these objectives are satisfied by a FOWT structure comprising one or two key subsystems, according to the appended claims.

SUMMARY

According to one aspect of the invention the primary subsystem comprises the assembly that controls the yawing rotation of the structure so that it can weathervane (passively) following the prevailing wind direction, around a substantially vertical axis. Since it is impossible to predict the number of complete rotations that the FOWT system will undergo during its 20 or 25 years lifetime, direct connection of the weathervaning structure to the seabed done directly with chains or cables would be likely to fail, as this uncontrolled twisting of the mooring system will eventually produce a mechanical failure.

Conveniently, according to a first aspect of the present invention, the FOWT platform comprises an anchored part, which does not weathervane and is attached to the seabed through a mooring system (typically chain, tethers, cables, or any combination of these). This mooring system connects the FOWT to one or more anchoring points, the choice of which depends mostly on the type of soil at the seabed. These can be, for example, a number of drilled holes with grouted piles (for a rocky seabed), a number of anchors, if the seabed is sandy, or a gravity base, which can simply consist of a big concrete block with embedded attachment points for the mooring lines. The rest of the FOWT would be the rotatable part, which connects to the anchored part through a means of rotation, which can have different embodiments such as journal bearings, rolling bearings, or equivalent, in such a way that the yawing rotation of the rotatable part of the FOWT is controlled and around a well defined axis, with low friction between the anchored and rotatable part of the FOWT.

According to another aspect of the invention, a crane built into the rotatable part of the FOWT is provided. In a conventional wind turbine having a tubular tower, the nacelle is placed at the top of the tower. The nacelle itself typically includes a small hoist to facilitate lifting small loads (such as one of the relatively small yaw motors) but does not have the power to lift a main component, such as a gearbox or generator. The main problem is that such a big hoist would require a robust substructure on the nacelle itself, which complicates the secondary frame of the nacelle. No matter how many reinforcements are added to the frame, obviously a nacelle-mounted hoist will never be able to lift the nacelle itself, which would be a very interesting feature for this subsystem.

Advantageously, the FOWT described in examples of the present invention does not feature a nacelle mounted at the top of a tower with an active yaw system. Instead the entire rotatable part will yaw following the wind passively (preferably), which in turn allows assembling the nacelle in a position that allows the FOWT to potentially include a crane that is capable of lifting the entire nacelle.

BRIEF DESCRIPTION OF THE DRAWINGS

Other features and advantages of the invention will become more evident from reading the detailed description of the preferred embodiments, of a structure for a floating offshore wind turbine (FOWT) according to the invention. The preferred embodiments are described as non-limiting examples with the help of the attached figures, in which.

DETAILED DESCRIPTION

Figure 1:
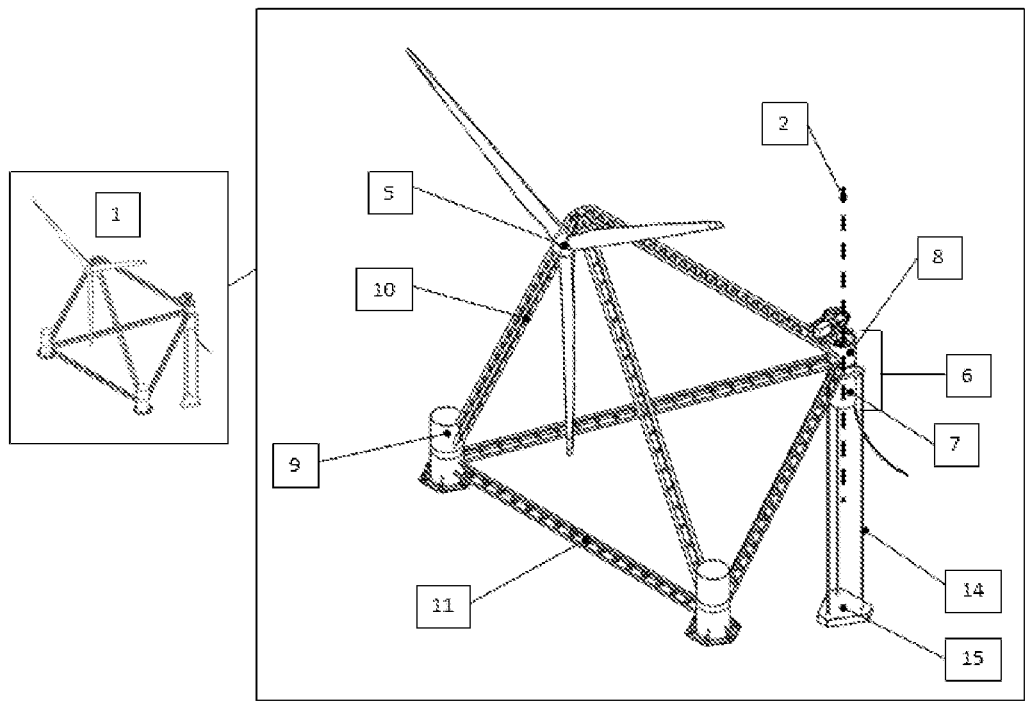
FIG. 1 is an isometric view of an example of the FOWT structure (1).
Figure 2:
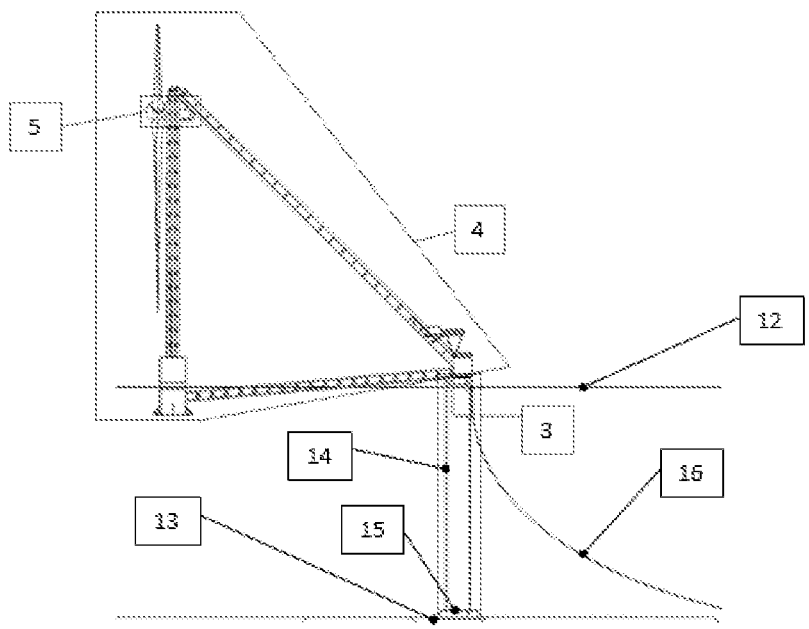
FIG. 2 is a side view of the FOWT (1) of the example of FIG. 1, also showing the sea surface (12) and the sea bed (13), where the structure is anchored. The position of the rotor-nacelle assembly (5) can be seen right under the apex of the mast structure. Additionally, the elements constituting the anchored part (3) and the rotatable part (4) of the structure are highlighted.

The installation of the FOWT can be split in two phases. In a first phase, the anchored part (3) of the FOWT is installed, including sea bed anchoring points (13) and anchoring means (14). In the same phase, the connection of the subsea electrical cable (16) can take place.

All these elements should preferably remain in the sea during the lifetime (20-25 years is typical) of the FOWT, with preferably minimum O&M requirements. In a second phase, a rotatable portion (4) of the FOWT is installed, including the turbine (5) itself. The rotatable portion may be configured be actively rotated or to passively weathervane. "Weathervaning" as used herein is to be understood as the rotation of an upper structure including the wind turbine with respect to a substantially vertical axis to align the wind turbine with the prevailing wind direction.

In an example, the proposed solution allows transporting the entire rotatable portion (4) from the port, where it can be fully assembled, to the installation site, just towing it with auxiliary ships and barges, without the need of heavy crane vessels. An important operation during this second phase is the connection between the rotatable portion (4) and the anchored part (3), which ideally needs to be executed quickly and safely.

To solve this requirement for a quick and safe connection, a novel yaw sub-system is presented here which includes the necessary means of rotation (17), as well as the quick connection/disconnection capability for the rotatable portion (4) of the FOWT. This sub-system may comprise one or more of the following characteristic elements:

The means of rotation (17) themselves, which allow the free yawing motion of the rotatable/rotatable part (4) of the structure around a substantially vertical axis. These means of rotation (17) may in particular be bearings and could have different embodiments known in mechanical engineering (roller bearings, friction bearings, etc) but typically these will have an inner ring (19) which is connected to the anchored part (3), and an outer ring (18) connected to the rotatable part (4) of the FOWT (1). Depending of the specific topology of the design, it could be more convenient to connect the outer ring (18) to the anchored part instead.

A system of inner (20) and outer (21) centering means, optionally a cone and counter-cone pair, which help position the rotatable/rotatable part (4) on top of the anchored part (3) at the time where these will need to be connected one on top of each other at the sea. This kind of conical connection, can help in this positioning and connection operation, since right before they contact each other, the anchored part (3) and the rotatable/rotatable part (4) are floating independently of each other. Due to the size of these structures, it is very difficult (and dangerous) to try to precisely control their relative motion at the sea, even in mild weather conditions. To perform the mechanical connection by means of a cone (on the anchored part (3)) and a counter-cone (connected to the inner ring (19) of the means of rotation (17)) effectively self-centers the connection. It is also possible to have the inner centering means (20) in the anchored part (3) instead, which would be an alternative embodiment. While the inner (20) and outer (21) centering means do not necessarily need to have conical shape, this geometry is relatively easy to manufacture and to metrologically verify by direct measurement, while also being relatively resistant to permanent deformation that could occur if there was an impact between the inner (20) and outer (21) centering means. The inner and outer centering elements may form a male-female coupling with complementary surfaces. In particular, the male-female coupling surfaces may have a gradually increasing width/diameter along a coupling axis.

A system of elastic elements (22), which acts as mechanical interface at one side of the means of rotation (17), effectively becoming the mechanical load transfer path between the anchored part (3) and the rotatable part (4). This system of elastic elements (22) may also have the function of allowing a limited relative rotation between the anchored part (3) and the rotatable part (4) in an axis perpendicular to the yaw axis (2) of the FOWT (1), and in addition to this may also protect the means of rotation (17) of the inevitable impacts that can occur during the installation process. These impacts, otherwise, could potentially damage the means of rotation (17), particularly if this is a roller bearing, independently of its load capacity, with the risk of compromising its function of allowing yawing motion with low resistance, and even lead to a critical failure that could compromise the stability of the entire FOWT. Certainly, the function of allowing small non-yawing rotations can be achieved for example using a spherical roller bearing, but these have lower load capacity and are particularly sensitive to impact loads. Therefore, the impact protection capability of the elastic elements (22) offers critical advantages that are not easy to obtain otherwise. In some examples, a second system of elastic elements at the other side of the means of rotation (17) may be included. As a result, the means of rotation (17) "floats" between two systems of elastic elements working in series. This would provide somewhat larger capacity to accommodate non-yawing rotations.

Coaxial electrical connection (23). The relative position between the anchored part (3) and the weathervaning/rotatable part (4) may be guaranteed by the centering means (20, 21) in all degrees of freedom, except for the azimuth position with respect to the yaw axis (2). In some examples, the centering means (20, 21) may include mechanical elements to control the azimuth position between the centering means (20, 21). This is one way of allowing an electrical connection to be executed at any point of the interface between the centering means (20, 21). However, this system might become complex. In another example, any azimuth position is allowed, and a coaxial electrical connection may be established, preferably by routing the cables directly through the centering means (20, 21). One could opt for an electrical connection that does not physically go through coaxially, but that would require the use of a slip-ring solution (or equivalent, i.e. with brushes) that would have electrical connection rings that would, themselves, be coaxial with the centering means (20, 21).

As already mentioned, it can be advantageous to have a system in place to avoid the failure due to accumulated torsion of the electrical coaxial cable (23) that goes through from the anchored part (3) to the rotatable part (4). Another option is to use a rotary connection (through slip rings, or even a contactless transmission device such as a transformer) which can avoid the build-up (and necessary release) of torsion. On the other hand, these can have relevant energy losses of up to 5%, and are quite costly for the power and intensity that needs to go through in this application. They are also difficult to maintain or substitute in case of failure.

In an example of the present invention, it is therefore proposed to leave a section of cable free so that it can accumulate a certain amount of torsion without exceeding its maximum allowed torsion angle, with the objective of allowing at least a full turn of the FOWT around its yaw axis.

Typical values for maximum acceptable torsion angle for this type of cable may be around 100° for each meter of free cable. A straight cable section of around 8 meters can therefore already absorb two full turns of the rotatable part (4) around the anchored part (3). Controlling this angle with adequate sensors, it is possible to at the right time fully disconnect one end of the cable and rotate the free end of said cable in the opposite direction to the measured rotation, relieving the torsion. After this, the free end of the cable can be mechanically connected again.

This entire operation (which can be done remotely or automatically) is actually a lot faster than to rotate the entire nacelle of an onshore WTG through its active yaw system, which is how this problem is dealt with in traditional tower-mounted WTGs. Clearly, in the proposed solution, the cable cannot be live (with voltage) when it is either connected or disconnected through an adequate plug, it is advantageous to have an appropriate switch too. But such a switch is desirable anyway for other operations, such as when there are personnel around the area of the yaw subsystem.

An additional aspect of the yaw subsystem (and particularly the yaw bearing) is that while it is installed well above the expected HAT (highest astronomical tide), it could be reached by water from a wave in storm conditions. In preferred examples, water access inside the interface between the anchored part (3) and the rotatable part (4) is avoided. Since on top of the yaw motion there are also small rotations in the axes perpendicular to the yaw axis, this is not as simple as having a normal seal. In a preferred example, it is proposed here to use a pneumatic system (with one or more elastic, torus-shaped pneumatic chambers), which can be pressurized during storm conditions to avoid water reaching sensitive systems even when fully submerged.

In mild weather conditions the pressure can be zero or near zero, which minimizes the wear on the pneumatic chamber that arises from friction against the two mating sides of the interface during yaw motion of the FOWT.

A second proposed subsystem is a crane, capable of lifting the nacelle (32) itself, or any of its sub-components. To this end, the FOWT (1) according to this example intentionally avoids using a vertical tower. The necessary elevation of the rotor-nacelle assembly (5) is achieved by means of a structure comprising inclined masts (10), each one connected to a means of floatation (6, 9), all of them converging at the highest point (the apex (31)) of the FOWT (1) structure.

Each means of floatation is also connected to at least one of the contiguous means of floatation by means of substantially horizontal pontoons (11), these being either totally or partially submerged under the water surface (12), solution preferred embodiment here is to use three means of floatation (6, 9), with which the structure ends up having the shape of a tetrahedron. This type of structure has a particularly good weight to strength ratio.

There is at least one known FOWT design that makes use of such a structure, known as Tetrafloat. One novel aspect of the present disclosure is the position and connection of the rotor/nacelle assembly (5) with respect to the apex (31) of the structure, which is done directly under the apex (31), instead of on top, as has been done in the prior art. In doing so, some meters of turbine axis height are lost and it is necessary to somewhat redesign the nacelle (32) itself, but in general these changes result in substantial weight reduction in the nacelle (32) since it is not necessary to have a main frame that transmits the loads from the rotor main bearings to the tower or supporting structure. Instead it is possible to support the nacelle (32) directly around the area of the frame around said main bearings.

Another advantage of positioning the nacelle (32) in this way is that it opens the possibility of using the mast (10) structure to mount a crane on the rotatable part (4) of the FOWT (1). The robustness of the mast (10) structure makes it possible to mount a crane powerful enough to lower and lift vertically the entire rotor/nacelle assembly (5), or of course one of its main components such as the nacelle (5), the gearbox, the generator or even some of the blades (37), in a secure and controlled way, from the ground (or a platform on the water) to its working position under the apex (31), the nacelle at this point making contact with the bottom surfaces of the masts (10) and/or the apex (31) of the structure. Having the FOWT (1) such a crane mounted on its own mast (10) structure, it is not necessary to use big crane vessels, which are required for any fixed-bottom offshore wind turbine.

The crane mounted on the mast (10) structure is also useful during the port assembly phase; an external crane is only required to assemble the masts (10) to each other. From this point on, only secondary cranes are needed to laterally control the loads to lift, but the use of big cranes (and once in the sea, crane vessels) is avoided. Certain operations can be risky to execute under ocean wave environment but disconnecting the rotatable part (4) of the FOWT (1) from the anchored part (3)—this being particularly simple as has been described in the yaw subsystem—the assembly can be towed to calm waters or a nearby port and carry out the operation there, without waves.

For reasons of completeness, various aspects of the second subsystem are set out in the following:

The elevation of a rotor/gondola assembly (5) may be achieved by a structure of oblique masts (10), which converge at the apex (31) of the structure and each mast (10) being connected at its base to means of flotation (6, 9).

The energy production position of the rotor/gondola assembly (5) may be totally or partially below the apex (31) where the masts (10) converge, allowing the rotor/gondola assembly (5) to be raised or lowered—or any of its components (32)—vertically without interfering with the structure of masts (10).

It has a permanent or removable system of motors (33), pulleys (34), cables (35) and other lifting elements of a crane, which allows raising/lowering the rotor/nacelle assembly (5) or any of its components (32), without the need to use an external crane.

In some examples, when a blade (37) has been positioned in a vertical position just below a rotor (36) of the wind turbine, one or more cables (35) can be passed through a hole in the rotor (36) located diametrically opposite to said blade (37), in order to be able to raise/lower said blade (37) acting the motor (33).

In some examples, the motor (27) can act on a cable (38) to move lifting means (39) that circulate using one of the masts (10) as support, so that personnel and/or loads can be raised from an access point (40) to the height of the rotor/gondola assembly (5).

In some examples, the masts (10) that do not have and access point (40) have a lifting means (39) from the nacelle to the base of the mast (10).

The two subsystems described above may be integrated in a FOWT (1) of very specific structure in the example of FIGS. 1-7 that makes the best use of their advantages, even though other configurations could be possible.

The structure comprises two main means of floatation (9)—preferably cylindrical buoys, which provide most of the floatability of the AMF (1)—and a third means of floatation, the pivot buoy (6), which in turn is split in a lower body (7) integrated in the anchored part (3) of the FOWT (1), and an upper body (8), integrated in the rotatable/rotatable part (4) of the FOWT (1).

The floatation provided by the pivot buoy (6) is limited, and its function is to provide a third support point for the FOWT, making it stable. The main means of floatation (9) may be interconnected between themselves and to the pivot buoy by means of substantially horizontal pontoons (11).

From each main means of floatation (9) and from the upper body (8) of the pivot buoy (6), an inclined mast extends upwards towards the apex of the structure, where the three masts connect. Two of these masts (10) may be in the same substantially vertical plane which is parallel to the rotor plane (or tilted slightly downwind). Note that the rotor itself preferably is in "downwind" configuration, meaning downstream, in the wind direction, from the rest of the structure.

The masts (10) may be truss structures to reduce aerodynamic losses. The horizontal pontoons (11) may also preferably be truss structures, in order to minimize wave slamming, which can occur when a wave hits a substantially flat surface, and can be quite violent in some circumstances. These impacts are small in truss structures of this type, built here using cylindrical tubes of relatively small diameter, which do not offer flat surfaces where the slamming phenomenon can be severe.

The mentioned downwind configuration of the rotor puts the rotor/nacelle assembly (5)—which has the highest aerodynamic drag—as far away as possible from the yaw axis (2), which results in the FOWT (1) responding faster to a change in the wind direction, improving the response of a passive yaw system by maximizing the yawing moment that aligns the structure (which is proportional to the distance between the center of the aerodynamic load—approximately the rotor center—and the yaw axis (2).

As has been mentioned, the pivot buoy (6) is split in an upper body (8), integrated into the rotatable part (4), and a lower body, integrated into the anchored part (3), which is connected to the sea bed (13) by means of three substantially vertical mooring lines (14), with their connection points forming a substantially equilateral triangle.

Each of the mooring lines (14) may typically comprise a combination of chains (at both ends) and steel cable (the longest section, connecting the chain sections). Therefore, the lower body (7) of the pivot buoy (6) may have the characteristics of a tension leg platform (TLP) of reduced dimensions.

This "mini-TLP" has sufficient tether pretension to markedly limit its motion except in the horizontal translation on the water surface (12) plane. This movement will happen, to some extent, to compensate for the thrust of the turbine. This mini-TLP has an advantage in that its subsea anchor point (15) can physically be a single body where the three mooring lines (14) connect, reducing installation time considerably when compared to other possible mooring systems not having the normal characteristics of a TLP.

The present invention however is not limited to its use with a TLP-type mooring system, but this system has advantageous features for a wide range of water depth and sea bed type. It features the shortest possible mooring lines (vertical), with all three lines participating in countering the turbine rotor thrust (as opposed to each line having, in some circumstances, to take on the entire turbine thrust). It also restricts vertical motion of the pivot buoy, which in turn, in the proposed embodiment, limits rotor motion along its own axis, which is beneficial for power stability of the wind turbine.

Given the fact that that the rotatable part (4) will be subject to small rotations in the two axis perpendicular to the yaw axis (2), the usefulness of the system of elastic elements (22) becomes obvious here. The distance between the main means of floatation (9) between themselves, and with respect to the pivot buoy (6), may be considerable (in the same order of magnitude as the elevation of the rotor/nacelle assembly (5) above the water surface (12)). At 80 meters and above, the pitch/roll angle of the structure can be under 10° even in severe sea states. This can already be absorbed by the system of elastic elements (22), if properly designed.

A FOWT such as the one herein described, but with smaller dimensions, is feasible in calm water locations, but not on open ocean waters such as the open North Atlantic Ocean, where waves up to 30 m height can occur. A preferred material for these elastic elements is preloaded natural rubber, due to its excellent mechanical properties and corrosion immunity, which are well known in the field of civil engineering where they are used to support road and train bridges for many years, without requiring any maintenance.

Figure 3:
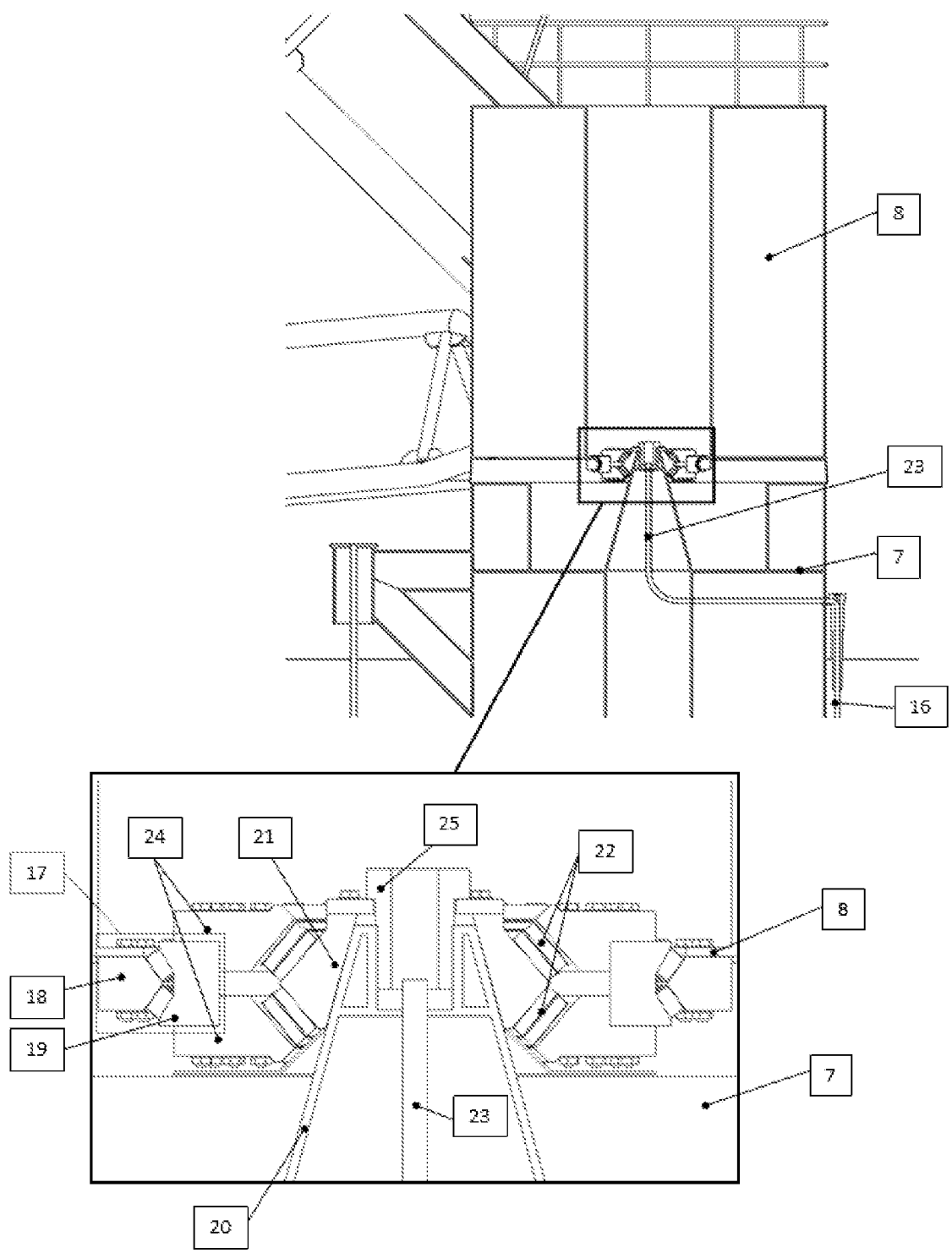
FIG. 3 is a section view of the pivot buoy (6) of the example of FIGS. 1 and 2, including a zoomed view of the means of rotation (17), centering system (20, 21), elastic element system (22), and coaxial cable (23).

A preferred embodiment for the yaw subsystem is shown in the detail view in FIG. 3. The means of rotation (17) chosen is a double row conical roller bearing, with the outer raceway (18) attached to the upper body (8) of the pivot buoy (6). It would also be possible to use a bearing with two rows of angular contact bearing balls, which has similar properties, as the ones commonly used for the yaw system and the pitch system, of an onshore wind turbine.

The inner raceway (19) of the bearing (17) may be firmly connected to two circular plates (24) which have a conical inner surface, with both circular plates (24) arranged symmetrically with respect to the medial horizontal plane of the bearing (17), one above and the other one below the inner raceway (19) of the bearing (17). The elastic elements (22) may be shaped like a tile, and distributed evenly along the inner conical surface of the circular plates (24), and may become preloaded as the bolted connection that connects the inner raceway (19) to the circular plates (24) is closed, also trapping the centering counter-cone (21) in between the inner surfaces of the elastic elements (22), as shown in FIG. 3).

The assembly of the bearing (17), the circular plates (24), the elastic elements (22) and the centering counter-cone (21) can be assembled independently, and be mounted below the upper body (8) of the pivot buoy (6) before installation at sea. During installation, this upper body (8) is elevated above the lower body (7), which has been previously pre-assembled and preloaded with the rest of the anchored part (3) in its mini-TLP configuration.

The centering cone (20) in this example is part of this lower body (7), which has rather generous dimensions. The angle of the centering cone may be designed to avoid interlocking with its counter-cone (21), and to have enough structural robustness to handle the loads going through.

A cone angle of approximately 15° is proposed in some examples, even though values between 10° and 30° are feasible. Once the upper body (8) is positioned on top of the lower body (7) more or less concentrically, the upper body (8) is lowered and the cone (20) and counter-cone (21) are allowed to make contact, with the impact energy being absorbed by the elastic elements (22). The assembly self-centers automatically as the gap between the cone (20) and counter-cone (21) is closed, while the upper body (8) is descending.

Once this joint is closed, the rotatable part (4) is already firmly attached to the anchored part (3), and one can proceed to secure the joint. It is proposed here to do this by means of a master bolt (25), of large size (special thread M200 or larger may be required for a MW system), and hollow on the inside, in order to allow the connection of the coaxial cable (23). This master bolt (25) is threaded directly into an internal thread machined in the cylindrical inner surface at the tip of the centering cone (20), and as it is tightened it completely locks the centering cone (20) against the counter-cone (21). Due to the large contact surface between these and to the tightening torque on the master bolt (25), the load path for variable loads will go through the centering means (20, 21) instead of going through the master bolt (25), which is very convenient from a fatigue standpoint.

As for the means to control the lifting and lowering of the upper body (8) of the pivot buoy (6), during the installation process, it is proposed in an example to do so by means of a barge (41) specially designed to attach to said upper body (and to aid in the transport of the structure from the port), capable of providing variable floatation by means of a system of inner chambers that can be flooded or emptied, like a submarine, to control draft. This kind of semi-submersible barge (41) is readily available in the market, only a suitable connection system to the upper body (8) or the pontoons around it might be designed ad-hoc. Alternatively, the lower body (7) can be partially submerged instead, since it already has a system of chambers. A combination of both is also possible.

Figure 4:
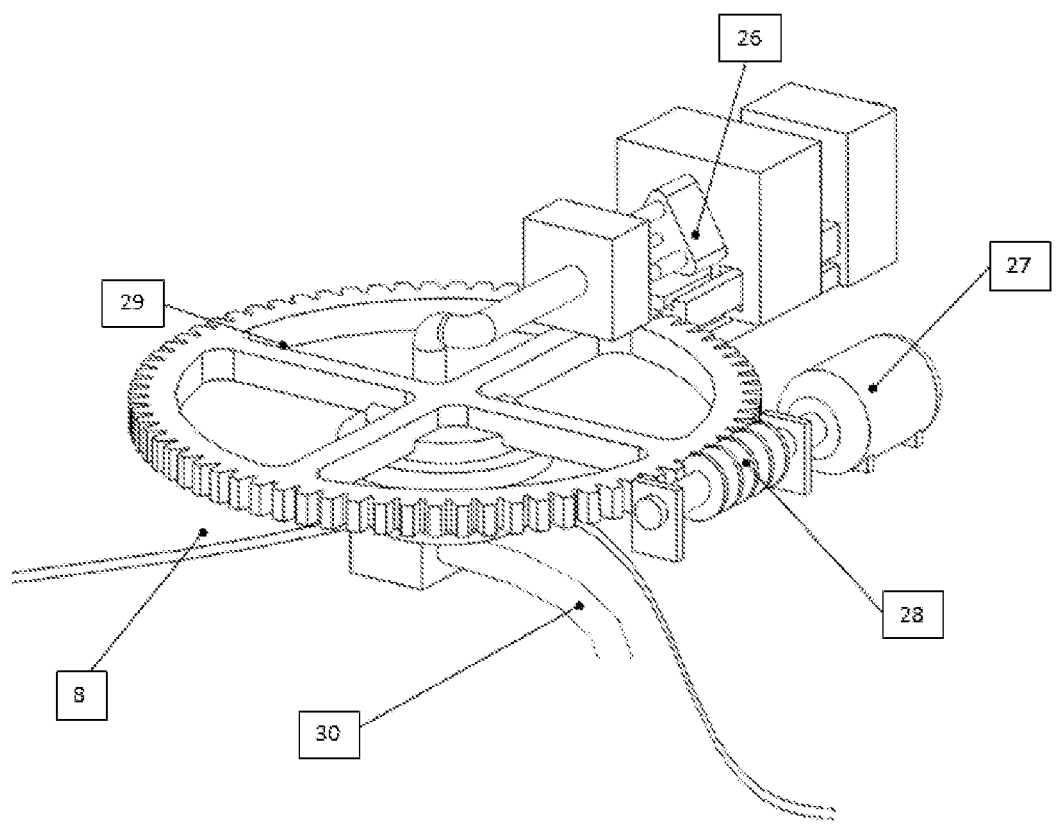
FIG. 4 shows, as an illustrative example, a possible embodiment of the mechanism proposed to loosen the accumulated torsion in the electrical cable section (30), including the mechanical means for connection/disconnection (26), and the motor (27) that acts upon the means of rotation (28, 29).
Figure 5:
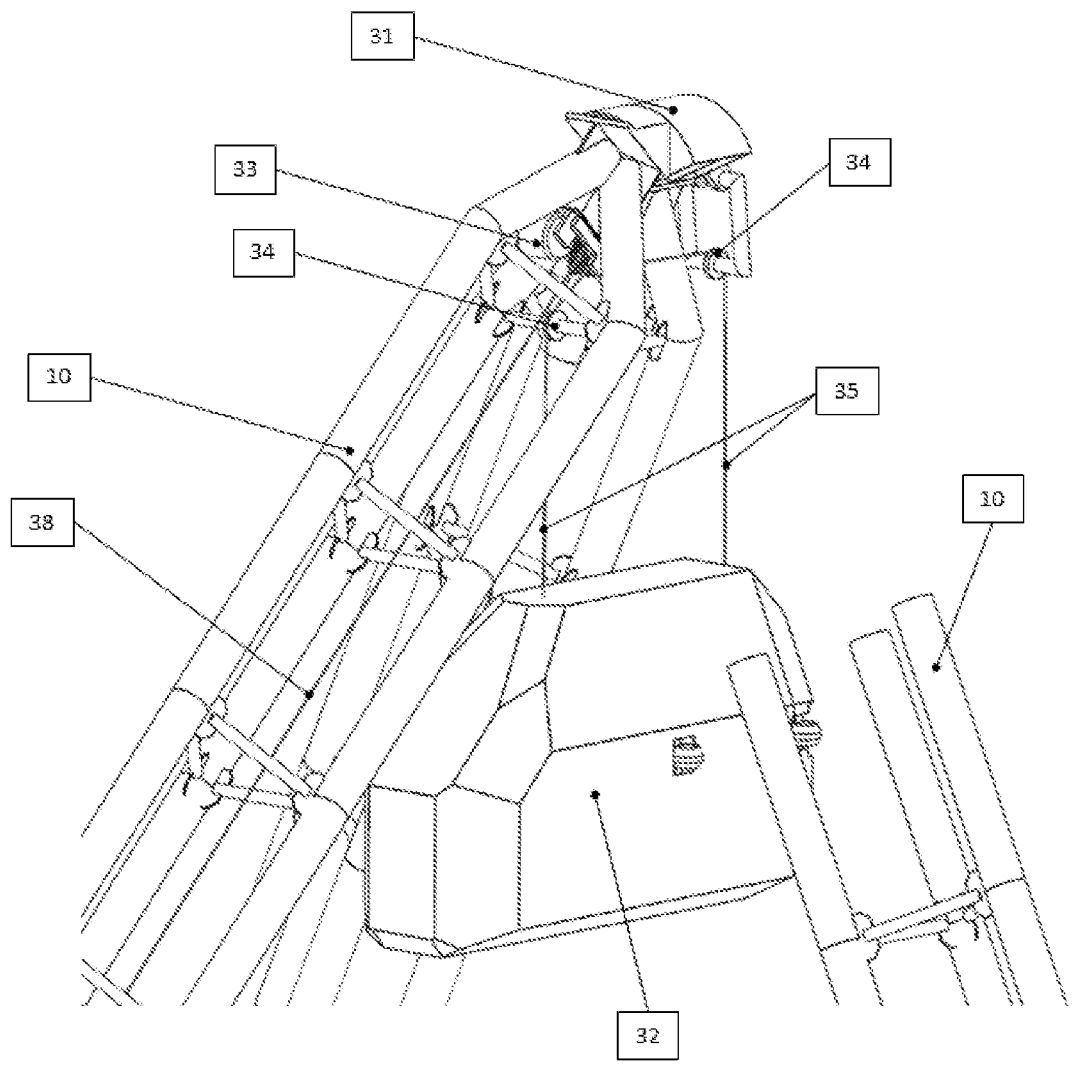
FIG. 5 illustrates a possible embodiment of the system that is proposed to lift any component (32) of the rotor-nacelle assembly (5), including a crane motor (33), acting on two cables (35) supported by pulleys (34), mounted directly on the truss structure of the masts (10). It also shows the position of the apex (31) and a section of the cable (38) for the means of lifting (39) for personnel.
Figure 6:
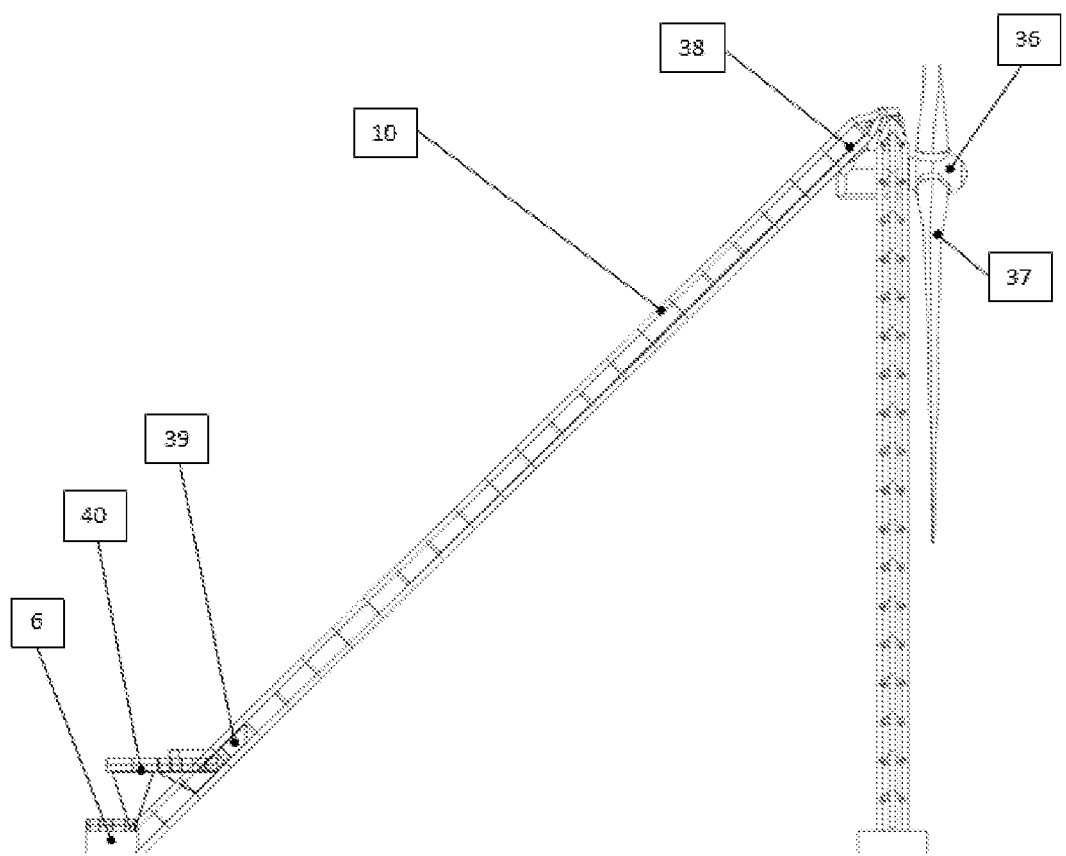
FIG. 6 shows the preferred configuration for the means of lifting (39), which circulate inside and through the mast (10) that connects the pivot buoy (6) to the apex (31) and where the helicopter access point (40) is also located, being the pivot buoy (6) itself the access point for ships. This figure also shows more clearly the rotor (36) from the HAWT, and one of the blades (37).

The system to release cable torsion can have multiple configurations that would be feasible; FIG. 4 shows a possible embodiment as illustrative example. A retractable plug (26) is mounted at the top area of the upper body (8) of the pivot buoy (6). In the same area a small motor (27) is mounted, which couples to a worm (28), which meshes with a worm wheel (29) that rotates around the same vertical yaw axis (2) of the FOWT (1).

A section of electrical cable (30) is attached to the lower side of the worm wheel, and extends vertically downwards for a distance of e.g. at least 8 meters (enough distance to accommodate two full turns of the FOWT (1) as it weathervanes following the wind), then going through the hollow part of the master bolt (25) and connecting to the coaxial cable (23). In this way, after two full rotations (or more, depending on the length of the vertically downward cable section (30)) of the rotatable part (4), the retractable plug (26) can be physically disconnected, and then the motor (27) actuated to unwind the cable (30) in the direction contrary to the accumulated torsion, after which the retractable plug (26) can be plugged back in. The system according to this example can avoid the considerable energy losses associated to a rotary connection, which is an alternative. And considering that the entire operation would be much faster than the equivalent in an onshore wind turbine (which requires rotation of the entire nacelle, which is extremely slow), the energy losses associated to the forced stop of the machine may be lower.

The crane system mounted on the rotatable part (4) of the FOWT (1) also has a variety of possible embodiments. The drive train may be attached to the structure below the apex (31) of the masts (10), instead of on top of a tower, which makes it possible to use the structure of masts (10) as the crane structure.

The truss structure of the masts (10) may have a configuration and properties that resemble that of a Derrick-type crane, but with a crane boom that is fixed with respect to the rotatable part (4).

FIG. (5) is included as illustrative example, showing a hypothetical lift operation for a component (32), in this case a nacelle. The last section of one of the masts (10) has here been eliminated to make visualization easier. The crane motor (33) is shown here at the top of the mast (10) that connects to the pivot buoy (6), but could just as well be mounted at the bottom, as is usual in Derrick cranes. The use of two lifting cables (35) instead of one makes it easier to control the load. It is proposed also to use the same crane motor (33) to mobilize the means of elevation (39)—that is, a lift, or elevator, with its own cable (38)—which would move through the same mast (10) where the crane motor (33) is mounted, which gives a double function to this considerably powerful crane motor (33).

This double function is made compatible by means of a gearbox with independent axles for the two functions, having a clutch, using the same motor. In addition to a main means of elevation (39), the structure can be fitted with secondary means of elevation on the masts without an access point (40), with the purpose of inspection of the masts themselves (welds, paint, etc) all of them connected to the crane motor (33), or with small secondary motors.

Figure 7:
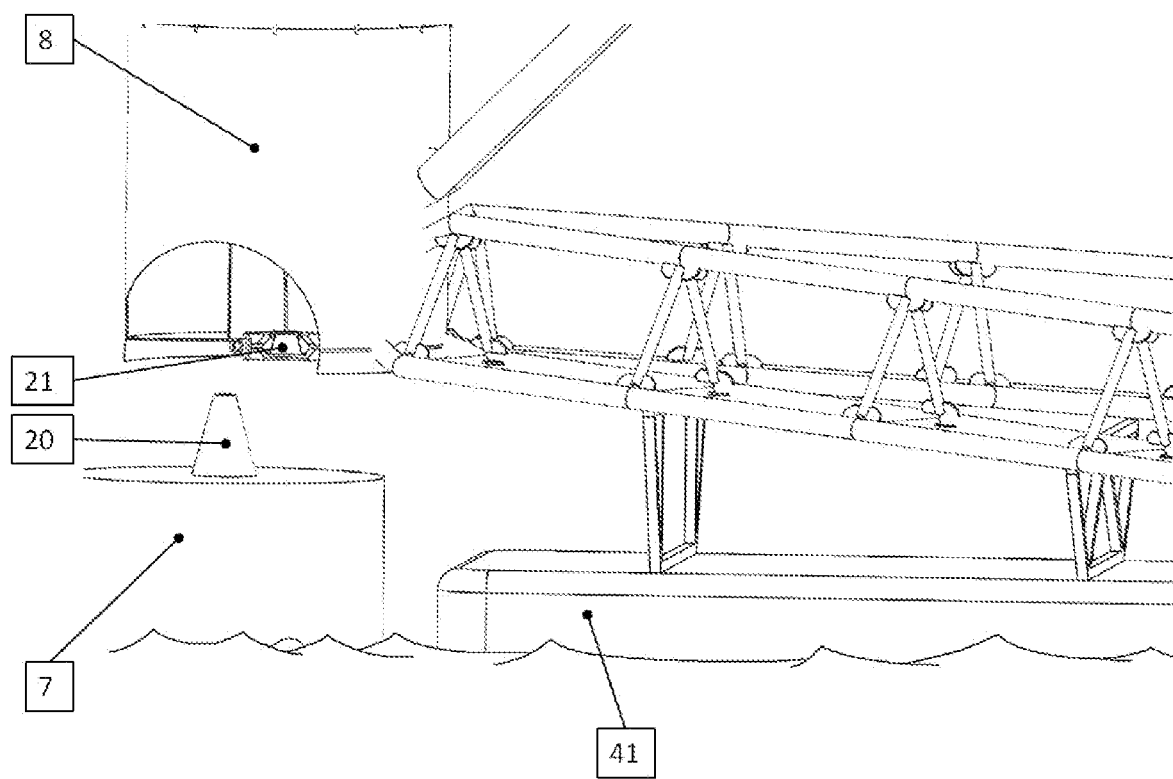
FIG. 7 illustrates an example of how a semi-submersible barge (41) fitted with adequate supports can control the positioning of the upper body (8) of the pivot buoy (6) on top of the already installed lower body (7), so that the male (inner) and female (outer) centering means (20, 21) are aligned before lowering the upper body (8), so that the entire rotatable part (4) can be properly locked into its working position on top of the anchored part (3). Note that part of the upper body (7) has been cut out to make this image, so that the outer centering means (21) is made visible in a section view.

FIG. 7 illustrates an example of how a semi-submersible barge (41) fitted with adequate supports can control the positioning of the upper body (8) of the pivot buoy (6) on top of the already installed lower body (7), so that the male (inner) and female (outer) centering means (20, 21) are aligned before lowering the upper body (7). As already mentioned before, a relative movement between the lower body (7) and upper body (8) may be achieved also by controlling a buoyancy of the lower body, in particular in the case of the lower body comprising a tension leg platform.

It is to be noted that in this example, before joining the upper body (8) with the lower body (7) at sea, the upper body (8) is pre-assembled with a bearing, i.e. a rotation means and a centering means, in this case female coupling (21) suitable to receive cone (20). That is, the system that is to be mated with the anchored part at sea comprises part of the upper body (8) which is fixed to the rotatable part of the structure and part of the lower body (7) which will be anchored. After assembly, the centering means both form part of the anchored part (3) of the structure. The male-female centering means enable the entire rotatable part (4) can be properly locked into its working position on top of the anchored part (3), even at sea.

The invention claimed is:

1. A floating offshore horizontal axis wind turbine structure comprising: an anchored part anchored to a sea bed, and a rotatable part, the structure being supported by at least three means of floatation including a pivot buoy, wherein the pivot buoy comprises:
   a lower body anchored to the seabed and an upper body fixed to the rotatable part of the wind turbine structure,
   an electrical connection between the lower body and the upper body of the pivot buoy, and
   a yaw system connecting the upper body with the lower body, wherein the yaw system comprises a means of rotation including an inner raceway connected to one of the upper body and lower body, and an outer raceway connected to the other of the upper body and lower body, and wherein the inner and outer raceways are configured to rotate with respect to each other around a vertical yaw axis, the yaw system being configured to allow an alignment of the rotatable part of the wind turbine structure with the prevailing wind direction, by rotating about the vertical yaw axis, the yaw system further comprising:

an inner centering means and an outer centering means which are coaxial with the yaw axis, and elastic elements arranged between the inner centering means and the inner raceway of the rotating means, the elastic elements acting as mechanical interface at one side of the means of rotation, and configured to transmit mechanical loads to the means of rotation, allowing a limited relative rotation between the rotatable part and the anchored part in an axis perpendicular to the yaw axis and protecting the means of rotation of the impacts than can occur during an offshore installation process of assembly of the rotatable part and the anchored part.

2. The structure according to claim 1, wherein the electrical connection between the lower body and the upper body of the pivot buoy is coaxial with the yaw axis.

3. The structure according to claim 2, wherein the inner centering means is a cone, and the outer centering means is a counter-cone.

4. The structure according to claim 1, wherein the means of rotation are bearings and the inner raceway of the bearings is connected to two circular plates which have a conical inner surface, with both circular plates arranged symmetrically with respect to the medial horizontal plane of the bearing, one above and the other one below the inner raceway of the bearing and the elastic elements are shaped like a tile, and distributed evenly along the inner conical surface of the circular plates, and the elastic elements are preloaded by bolted connection that connects the inner raceway to the circular plates also trapping the centering counter-cone in between the inner surfaces of the elastic elements.

5. The structure according to claim 4, wherein the elastic elements are made of a preloaded natural rubber.

6. The structure according to claim 1, wherein a second system of elastic elements at the other side of the means of rotation is included.

7. The structure according to claim 1, wherein the yaw system is a passive yaw system configured to allow the rotatable part to weathervane and align with the prevailing wind direction.

8. The structure according to claim 1, in which the anchored part comprises a tension leg platform comprising a floating lower body and a plurality of mooring lines.

9. The structure according to claim 1, wherein the electrical connection between the lower body and upper body of the pivot buoy comprises a section of the electrical cable through which the electricity generated by the wind turbine is transmitted, and which goes through the pivot buoy, has an axial free length that is long enough to accommodate torsion of at least one full turn of the rotatable part with respect to the anchored part, without exceeding a torsion limit of the cable.

10. The structure according to claim 9, further comprising mechanical means for connection/disconnection of the electrical cable, means of rotation actuated by a motor capable of turning one of the ends of the electrical cable to compensate the torsion accumulated in it, and a control system that, having measured a certain rotation angle between the lower body and the upper body of the pivot buoy, unplugs the mechanical means of connection/disconnection, actuates the motor until the means of rotation unwind the turns measured by the system on the end of the electrical cable in which they act, releasing the torsion accumulated in it, and then plugs back in the means of connection/disconnection.

11. The structure according to claim 1, comprising a rotary electrical connection between the rotatable part and the anchored part of the structure.

12. A method for installing a floating offshore horizontal axis wind turbine structure comprising: an anchored part anchored to a sea bed, and a rotatable part, the structure being supported by at least three means of floatation including a pivot buoy, wherein the pivot buoy comprises:

a lower body anchored to the seabed and an upper body fixed to the rotatable part of the wind turbine structure, an electrical connection between the lower body and the upper body of the pivot buoy, and a yaw system connecting the upper body with the lower body, wherein the yaw system comprises a means of rotation including an inner raceway connected to one of the upper body and lower body, and an outer raceway connected to the other of the upper body and lower body, and wherein the inner and outer raceways are configured to rotate with respect to each other around a vertical yaw axis, the yaw system being configured to allow an alignment of the rotatable part of the wind turbine structure with the prevailing wind direction, by rotating about the vertical yaw axis, the yaw system further comprising:

an inner centering means and an outer centering means which are coaxial with the yaw axis, and elastic elements arranged between the inner centering means and the inner raceway of the rotating means, the elastic elements acting as mechanical interface at one side of the means of rotation, and configured to transmit mechanical loads to the means of rotation, allowing a limited relative rotation between the rotatable part and the anchored part in an axis perpendicular to the yaw axis and protecting the means of rotation of the impacts than can occur during an offshore installation process of assembly of the rotatable part and the anchored part, the method comprising:

anchoring the lower body of the pivot buoy, the lower body carrying one of the inner and the outer centering means, mounting the elastic elements below the upper body on land, before installation;

positioning the upper body above the lower body, the upper body carrying the other of the inner and outer centering means coaxial with the yaw asix and moving the upper body and lower body with respect to each other for the inner and outer centering means to engage with each other.

13. The method according to claim 12, wherein the positioning of the upper body and a lowering of the upper body are carried out with a semi-submersible barge.

14. The method according to claim 12, wherein the lower body comprises a tension leg platform, and wherein a raising of the lower body is carried out by controlling a buoyancy of the tension leg platform.

* * * * *